United States Patent Office 3,390,830
Patented July 2, 1968

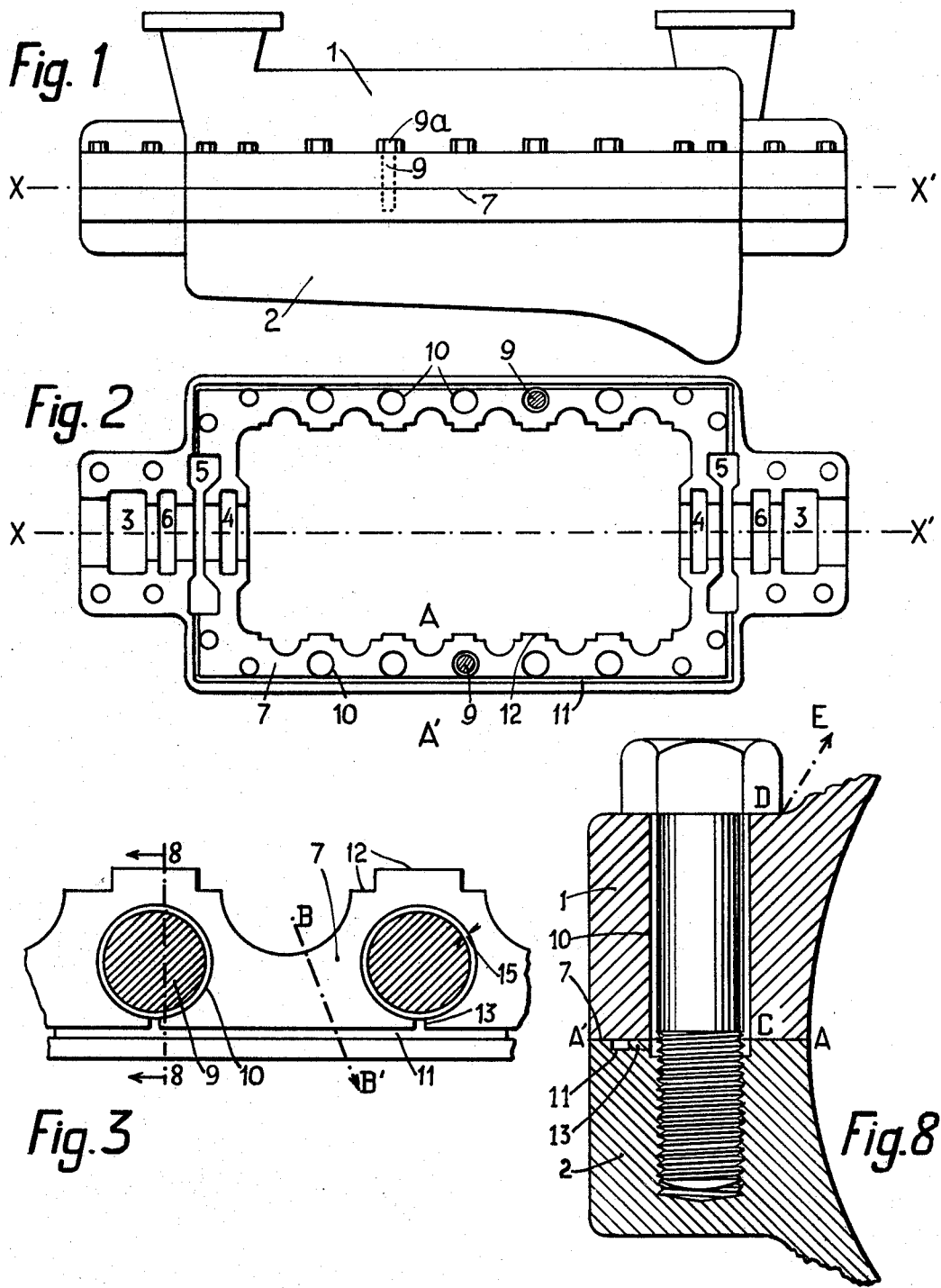

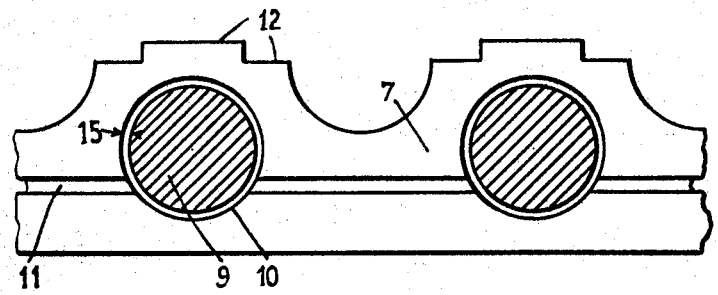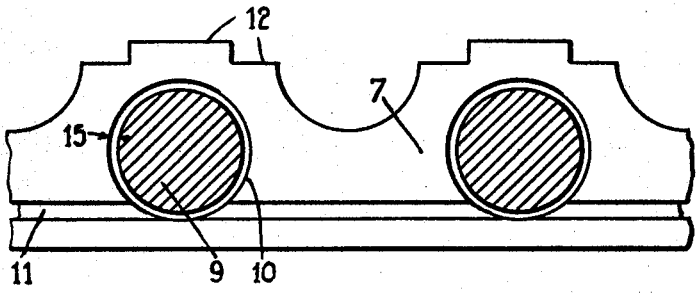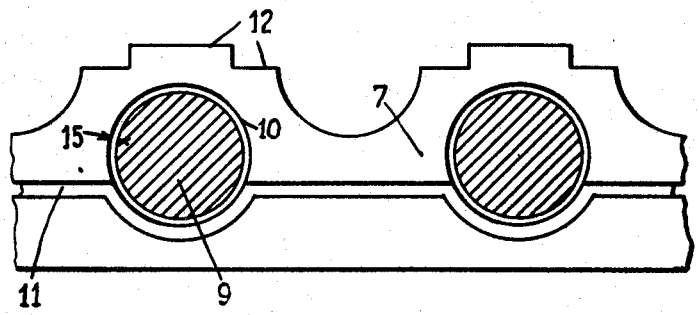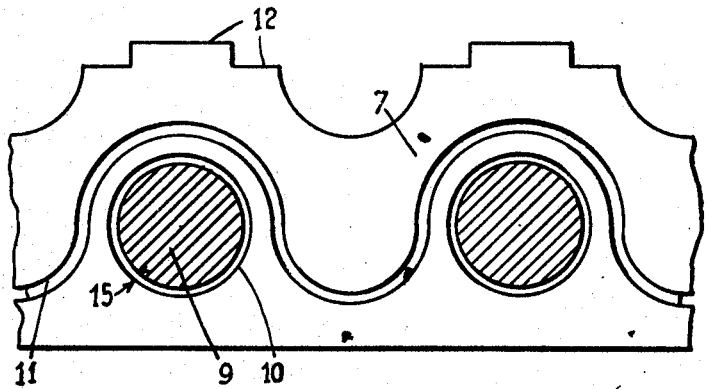

3,390,830
SEALING OF HORIZONTALLY-SPLIT
CENTRIFUGAL COMPRESSORS
Wilhelm Kahane, The Franconia, 20 W. 72nd St.,
New York, N.Y. 10023
Continuation-in-part of application Ser. No. 345,781,
Feb. 18, 1964. This application Apr. 14, 1967, Ser.
No. 630,933
2 Claims. (Cl. 230—133)

ABSTRACT OF THE DISCLOSURE

A sealing is described for horizontally-split casings of centrifugal gas compressors. The interface of the flanged joint of the split casing contains peripheral gas-leakage-catching grooves that end into and communicate with the bearing isolation chambers, which act as a safe location for the venting of the casing gas leakages to prevent their escape into the atmosphere around the casing. An alternate is described where said peripheral leakage-catching grooves communicate also with the clearance spaces between bolts and bolt-holes.

Horizontally-split casings, provided with this sealing, can be allowed the same maximum working pressure in the compression of highly hazardous hydrogen-rich gases as in the compression of air.

This is a continuation-in-part of my application, Ser. 345,781 of 1964, now abandoned in which I proposed a horizontally-split casing, for centrifugal compressors handling toxic or highly hazardous gases, that is provided, in the interface of the joint made by its two flange-bolted halves, with a system of grooves for venting the gas leakages to a safe location in order to prevent their entrance into the atmosphere around the compressor. In the description of that application, I mentioned the arrangement whereby the main venting channels end directly into the bearing isolation chambers of the compressors, said chambers acting as the safe location for the venting of the casing gas leakages. The present application completes that disclosure.

FIG. 1 is an elevational view of a typical horizontally-split casing for centrifugal compressors handling dangerous gases.

FIG. 2 is a schematical plan view of one of the two halves of the compressor casing, showing the interface of the joint between the two halves of that casing, when it is provided with the proposed device.

FIGURES 3 through 7 represent a detail of FIG. 2 and show examples of the path followed by the peripheral leakage-catching groove of the proposed venting system.

FIG. 8 is the cross-section along plane 8—8, of FIG. 3, perpendicularly to the interface of the joint of the horizontally-split casing represented in FIGURES 1 and 2.

In horizontally-split casings, comprising a flange-bolted joint and handling toxic or highly hazardous gases, the maximum admissible working pressure is controlled by the maximum admissible rate of gas leakages through the joint into the atmosphere around the compressor rather than by the wall strength of the vessel. This is why one and the same horizontally-split centrifugal compressor casing which, as an example, is rated at 800 p.s.i. when used in the compression of air, cannot be permitted more than 300 p.s.i. if the gas to be compressed contains an important amount of hydrogen. This is so because hydrogen presents a great fire and explosion hazard and because, due to its low molecular weight, it has a high diffusivity through the sealing imperfections of the joint. In the above example where, in the present status of the art, hydrogen-rich gases are to be compressed at 800 p.s.i. in a horizontally-split casing, the above mentioned loss in the casing's maximum working pressure has following unfavorable consequences. First, the compression of hydrogen-rich gases at 800 p.s.i. can no longer be done in the large size (inside diameter) casings that were admissible for the compression of air, but only in smaller size ones, whose basic much higher maximum working pressure for air was high enough to still withstand 800 p.s.i. when compressing hydrogen-rich gases. Therefore, in the present status of the art, instead of using one single high-capacity unit compressor manufacturers are compelled, in the conditions of that example, to connect in parallel two or more units of a smaller size. The drawbacks of this arrangement are the higher occupied floor space and higher investment costs. Besides, for any given compressor type, the smaller the size (inside diameter) the lower the hydraulic efficiency of the compression and the higher the horsepower consumption.

All attempts done in the past to increase the tightness of the joint by means of special gaskets have proved unsuccessful and even dangerous, so that now only metal-to-metal contact joints are admissible. Leakages through the joint and along the bolts of horizontally-split casings, unless vented, cannot entirely be prevented from entering the room around the compressor. Therefore, I concluded that the only practical way to eliminate hazards and damage to equipment and personnel, while still being able to use, in the compression of hydrogen-rich or other dangerous gases, the same large size casing at its full maximum working pressure as in the compression of air, is to include in the joint a venting system to take care of the leakages through the joint's interface and of those occurring alongside the bolts.

Venting of the interface of joints or venting of spaces around bolts, in pressure vessels sealing, are known. But until now, venting has never been applied in a practical way to the leakages through the interface of the joint in horizontally-split casings, inasmuch as no simple and economic solution has been proposed on that problem. This, in spite of the wide use, during the last 30–40 years, of the compression of hydrogen-rich gases in hydrogenation of coal, of lubricating oils and of other petroleum fractions, as well as in the synthesis of ammonia for fertilizers, and in spite of venting having the potentiality, as in my solution, to solve the problem of boosting the casing's reduced maximum working pressure when compressing hydrogen-rich gases up to that which is permissible in the compression of air.

Most horizontally-split centrifugal compressors contain, as a standard, the parts whose location is shown in FIG. 2, a schematic plan view of one of the two halves of the casing. In that drawing, XX' is the axis of the main shaft not shown, A is the pressure chamber, A' represents the atmosphere around the compressor, 3 represents locations of the bearings that support the shaft and are placed in said casing at its longitudinal extremities, 4 represents locations of the high differential-pressure shaft-seals which minimize the amount of gas leakages that come around the shaft from the pressure chamber A toward bearings 3, while 5 shows the bearing isolation chambers which are hollow depressions in the inner surface of the casing, outside of the pressure chamber, these depressions forming in the thickness of the metal of the casing hollow tores, whose axis is the same as that of the shaft, and which are open toward the shaft surface. In said bearing isolation chambers 5, that are located between the high pressure shaft-seals 4 and bearings 3 so that the gas leakages escaping from the pressure chamber A through seals 4 are trapped in the bearing isolation chambers 5, the pressure is maintained below the atmospheric pressure by means not shown in the drawing and which create a slight vacuum within said bearing isolation chambers for the evacuation of gas leakages to a safe location. 6 is the location of the low differential-pressure shaft-seals that minimize the entrance of atmospheric air, through the shaft bearings 3, to the bearing isolation chambers 5 that, as said, are kept under a slight vacuum. The high differential-pressure seals 4 are ordinarily of the "oil film" type or of the "contact-seal" type, while the low differential-pressure seals 6 usually are of the "labyrinth" type or of the "multiple carbon ring seal" type. In horizontally-split compressors not provided with the proposed improvement, gas from the pressure chamber A may leak into the atmosphere A' around the compressor by following one or both of the following paths: BB', in the plane of the interface 7 of the joint, as shown by an arrow in FIG. 3, and ACDE, as in FIG. 8. To follow the latter path, leaks travel through AC from the pressure chamber A into the clearance space 15 between the shank of bolts 9 and bolt-holes 10; then from the clearance space 15 to the atmosphere around the compressor, across path DE through the imperfections of the contact of the nut 9–a with the surface of flange of the casing.

The improvement I propose consists in that in one of the two halves 1 or 2 of the horizontally-split casing, hold tightly together by bolts (or studs) 9 and in mutual contact along a surface 7, thereafter called "interface," that forms the joint and which is traversed by said bolts, a venting channel 11 with its general direction following that of the row of said bolts is grooved in that interface near its outer contour. A distinctive characteristic of the invention is that said venting channel 11 ends into, and communicates with, one of the bearing isolation chambers 5 of the compressor. The gas leakages, thus vented into these chambers through the venting channels 11, and which are due to the imperfections of the casing's joint, mix in said chambers with the gas and the air leakages coming from the pressure chamber A and from the bearings through the shaft seals 4 and 6. The totality of the leakages is further evacuated to a safe location, and eventual reuse, by means not shown in the drawings that create the previously mentioned slight vacuum in said bearing isolation chambers. It is to be noted that the ending of said peripheral leakage-catching channels 11 into, and their open communication with, the bearing isolation chambers 5 lends practical value to the proposed improvement by eliminating the need for external connections in venting, which may create a new source of troubles, and by shunning the need of means for the evacuation of the leakages from the joint, in addition to the already existing means.

In most of the proposed designs of the grooving system I recommend for venting, as in FIGS. 3 through 6, the venting channel 11 communicates with the clearance spaces 15 left by bolts 9 within the bolt-holes 10, thus venting both the leakages that might come straight through the interface 1, i.e. those which follow the previously mentioned path BB', as well as those that might reach the clearance spaces around the bolts to use the route ACDE along the shank of the bolts. The leakages along the path BB' are now barred from entering the atmosphere around the compressor by the venting channel 11 itself. The second route ACDE is barred by the venting of the clearance spaces 15 into the same main venting channel 11.

Horizontally-split casings of centrifugal compressors usually need two peripheral leakage-catching grooves 11, as shown in FIG. 2, one for each row of bolts 9. Alternates of the design of the grooving system for venting are shown, as examples, in FIGURES 3 through 7. FIG. 7 is a cut-away plan view of a detail of the interface 7 of the joint, for casings that have exceptionally wide flanges. In such casings, portions of the peripheral leakage-catching grooves 11 may run between the bolt-holes 10 and the edge 12, of the interface 7, that contacts the pressure chamber A. No connection between groove 11 and the clearance spaces 15 are needed, in the example of FIG. 7, as no leakage can reach the latter spaces. But in most casings, as in the examples of FIGURES 3 through 6, the width of the flange is not large enough to place portions of the peripheral groove 11 between the edge 12 and bolt-holes 10 without weakening the tightness of the joint. For this reason, in such instances, the venting system must include the venting of the clearance spaces 15. In the proposed device, this is achieved by the grooving system comprising connections of the clearance spaces 15 with the peripheral groove 11. In FIG. 3, short grooves 13 connect the clearance spaces 15 with the peripheral grooves 11. In the example of FIG. 4, where the peripheral grooves 11 intersects the bolt-holes 10, those short grooves are no longer required. A limit case is that when, as considered in FIGURES 2 and 5, the peripheral groove is tangent to the bolt-holes' circumferences. In the design of FIG. 6, which is an adaptation of that of FIG. 4, for casings with exceptionally narrow clearance spaces 15, the peripheral groove 11, though intersecting the bolt holes, has its continuity, and thus an easy flow of the vented leakages through it, being assured by means of shunt grooves 14, obtained by cutting away the bolt-hole corners at the intersection of the cylindrical surface of the bolt-hole 10 with the plane of the interface 7.

The gas that escapes from the interface 7 of the joint and is vented, as described, through the peripheral leakage-catching grooves 11 into the bearing isolation chambers 5, mixes therewith that which escapes into the same location as gas leaks from around the shaft across the high-pressure shaft-seals 4. As already mentioned, it may be recovered if so desired. Because of the much higher differential-pressure existing between the pressure chamber A and the bearing isolation chambers 5 than that existing between the atmosphere around the compressor and said bearing isolation chambers, the contamination with air of the recovered gas is, in the present compressors, in all safety much below that which might cause a hazard. That safety is not liable to be disturbed by the additional inflow into the bearing isolation chambers of the mixture of leakages of gas and air arriving through grooves 11 inasmuch as the amounts of gas and air brought into them through the imperfections of the casing's joint are incomparably lower than those coming through the shaft-seals. It is so because, while the differential-pressures are the same for both, the flow resistance through the tightly bolted joint of the casing is incomparably higher than that through the relatively loose contacts between shaft and seals.

Summing up, the invented device is a flanged, split casing in combination with communicating vent means between the peripheral catch grooves, the bolt clearances and the bearing isolation chamber. Centrifugal compressors, when provided with that device, acquire the same maximum admissible working pressures in the compression of hydrogen-rich gases as in the compression of air. The application of the invented device in large-capacity compression plants for hydrogen-rich gases frees the user from the need, that exists in the present status of the art, of employing either a larger number of smaller units, instead of a single large horizontally-split unit, or employing a vertically-split barrel type compressor, both present alternatives imposing an unnecessary increase of the capital investment and consumption of power. Because of that combination of elements, this new result has been obtained without introducing complication nor cost, and without the use of external connections that imply additional hazards, by simply connecting the casing-sealing system to the existing shaft-sealing one.

What I claim as new is:

1. A horizontally-split casing for centrifugal gas compressors, said casing consisting of two flange-jointed halves pressed together by a row of bolts against the interface of their mutual metal-to-metal contact and housing among other items: the pressure chamber; the bearings that support the shaft and that are located in said casing at its longitudinal extremities; high-pressure shaft-seals that minimize the amount of gas leakages coming around the shaft from the pressure chamber toward the bearings, these high-pressure shaft-seals surrounding the shaft and being located, inside of said casing, between the pressure chamber and the bearings; the bearing isolation chambers, which are hollow depressions in the inner surface of the casing, outside of the pressure chamber, these depressions forming in the thickness of the metal of the casing hollow tores whose axis is the same as that of the shaft, these toric spaces being open toward the shaft surface, said bearing isolation chambers being located between the high-pressure shaft seals and the shaft bearings, the pressure in said bearing isolation chambers being kept below the atmospheric pressure by means that create a slight vacuum therein which causes the said gas leakages that come around the shaft toward the atmosphere to be trappet into said bearing isolation chambers and allows their evacuation to a safe location; and the low-pressure shaft seals that are located between the bearing isolation chambers and the shaft bearings and which minimize the entrance of atmospheric air, through the bearings, to said bearing isolation chambers whose atmospheres are under slight vacuum;

in combination with:

a system of vent grooves in the above defined interface of the joint made by the two halves of said casing, that system of grooves comprising peripheral gas-leakage-catching grooves, whose general direction follows that of the row of bolts, that tighten the joint, and the contour of the pressure chamber so that said grooves cross the paths of all potential leakages that might travel from the pressure chamber, along said interface, into the atmosphere around said casing; these leakage-catching grooves being characterized by their ending into, and openly communicating with, the bearing isolation chambers, into which said leakages are trapped before evacuation.

2. A horizontally-split casing for centrifugal gas compressors, as defined in claim 1, whose therein described peripheral gas-leakage-catching grooves, beside communicating with the bearing isolation chambers, communicate with the clearance spaces in the bolt-holes around the shank of the bolts that hold together the two halves of the casing.

References Cited

UNITED STATES PATENTS

| 1,607,234 | 11/1926 | Brown | 230—205 |
|---|---|---|---|
| 1,902,406 | 3/1933 | Inokuty et al. | 103—108 |
| 2,632,395 | 3/1953 | Jennings et al. | 103—108 |
| 652,396 | 6/1900 | Lovekin. | |
| 1,497,652 | 6/1924 | Browne. | |
| 1,791,810 | 2/1931 | Furman. | |
| 2,352,583 | 6/1944 | Zetterquist. | |
| 2,532,891 | 12/1950 | Chupp. | |
| 2,590,803 | 3/1952 | Unger et al. | |
| 2,679,411 | 5/1954 | Moore. | |
| 3,055,538 | 9/1962 | Schoessow. | |
| 3,139,786 | 7/1964 | Ardell. | |

FOREIGN PATENTS 363,835  12/1931  Great Britain.

HENRY F. RADUAZO, *Primary Examiner.*